May 10, 1932.     C. E. WEST     1,857,773

BRAKE TESTING DEVICE

Filed March 25, 1929

Inventor
C. E. West
By Yang & Yang
Attorneys

Patented May 10, 1932

1,857,773

UNITED STATES PATENT OFFICE

CARL E. WEST, OF WATERTOWN, WISCONSIN

BRAKE TESTING DEVICE

Application filed March 25, 1929. Serial No. 349,640.

This invention relates to new and useful improvements in brake testing devices.

One of the objects of my invention is the provision of a brake testing device which can be quickly and readily applied to a vehicle wheel whereby the wheel can be moved against the brake action and the resistance of the brake indicated by a registering member so as to readily determine whether or not the brake band needs tightening and at the same time it will be noted that brake bands of a motor vehicle can all be registered for the same amount of brake action.

Another object of my invention is the provision of a brake testing device of the above character which is interchangeable so that it can be quickly and readily applied to either the right or left wheel of a motor vehicle and quickly clamped thereto without injuring the pneumatic tire and is readily operable to indicate the amount of resistance in the brake action.

A further object of the invention is the provision of a brake testing device which when applied to the wheel, is so constructed that the application of pressure is equally distributed throughout the contour of the wheel so that no particular point receives a greater strain on the wheel and the resistance of the brake action can be quickly and readily determined.

With the above and other objects in view, the invention consists in the novel features of construction, the combination and arrangement of parts hereinafter more fully set forth, pointed out in the claims and shown in the accompanying drawings wherein:

Figure 1:
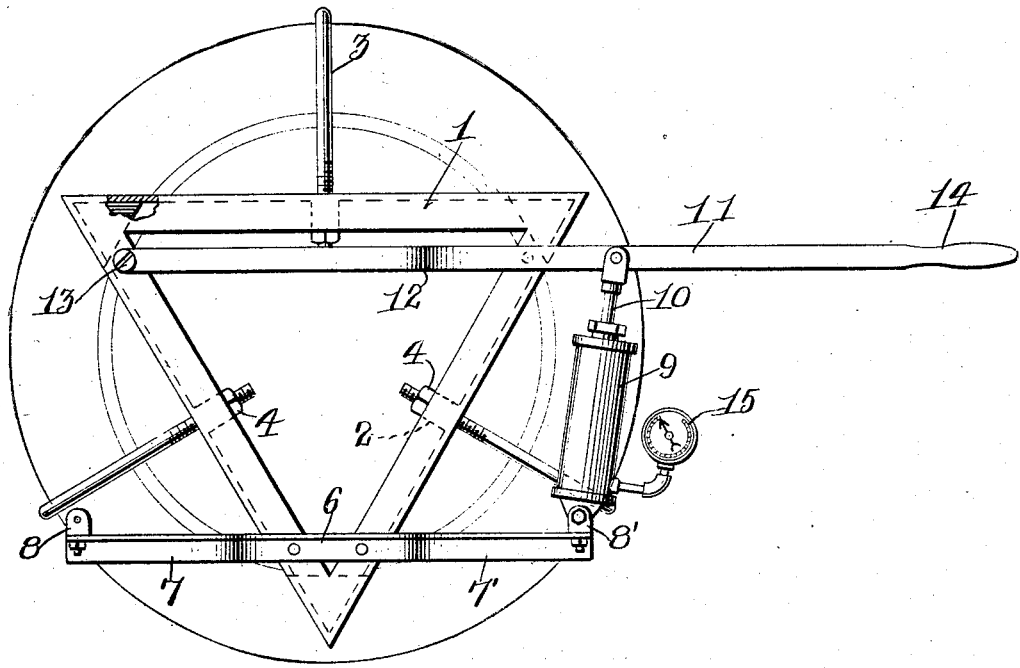
Figure 1 is a side elevation illustrating the application of my improved brake testing device.

Referring more particularly to the drawings wherein I have illustrated the application of my improved device, it will be noted that the device comprises a substantially triangular frame 1 preferably formed of angle iron and midway between each point of the frame are the sleeves 2 which receive therethrough the threaded portion of the securing hooks 3. The threaded portions of the hooks 3 are loosely mounted in the sleeves 2 and have adjusting nuts 4 thereon bearing against the inner ends of the sleeves for adjusting the hooks 3 to engage them with the tire of the wheel as shown in the drawings. From this, it will be apparent that when the hooks are engaged with the pneumatic tire on the wheel, they can be tightly clamped thereto through the adjustment of the nuts 4.

In tightening the clamps or hooks to the pneumatic tire, it has a tendency to draw the frame 1, tightening the same against the outer surface of the tire and in order to prevent the angle iron formation of the frame from cutting or mutilating the tire, I provide substantially triangular bearing plates 5 at each corner of the frame. These plates are provided with substantial flat bearing surfaces adapted to engage the pneumatic tire to prevent the angular frame work from contacting with the tire. These plates 5 may either be supported by the frame or connected thereto as desired.

A supporting member is extended transversely across one corner of the frame, said supporting member having its intermediate part offset as shown at 6 and riveted or otherwise secured to the frame 1.

Figure 2:
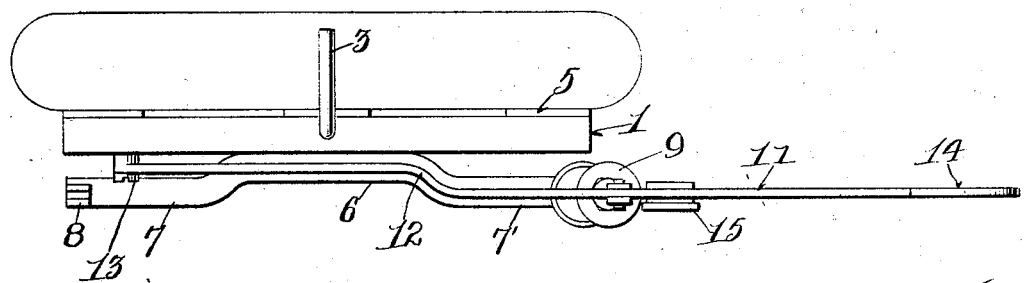
Figure 2 is a plan view.

The ends of the supporting member are indicated at 7 and 7' and these ends are arranged in substantial alignment as shown in Figure 2 and support bifurcated brackets 8 and 8'. The length of the supporting member is substantially equal to the widest part of the frame 1 and loosely mounted upon either one of the bifurcated brackets is a compression cylinder 9 having a piston 10 reciprocating therein, which is connected at its outer end to a lever 11. This lever is also provided with an offset portion 12 adapted to correspond with the angular ends of the offset portion 6.

The inner end of the lever 11 is pivotally mounted on a removable pin 13 while the outer end of the lever is provided with a hand grip 14. The inner end of the lever is pivoted on one of the side portions of the frame 1 at a point adjacent one corner of the frame with the lever extending transversely across the frame, but connected to the piston 10.

In order to regulate the pressure within the cylinder 9, I provide a gauge 15 which is connected to the inner end of the cylinder and is adapted to register the downward pressure of the piston, this registration indicating the resistance of the brake drum.

It will be apparent from the illustration that the cylinder 9 can be supported at either end of the supporting member by attaching the same either to the bracket 8 or to the bracket 8' and the lever 11 can have its position reversed by removing the pivot pin 13 from its present position and engaging it with the opposite side of the frame.

Thus, the device can be used on either side of a motor vehicle to test the brakes of the wheels thereof, without removing the wheels from the vehicle, it only being necessary to use an ordinary type of jack to disengage the wheels from the surface on which they are resting.

In using my improved brake testing device, the hooks or clamps 3 are adjusted to engage the pneumatic tire of a wheel and then clamped tightly thereto, said clamping action drawing the frame 1 tightly against the outer face of the wheel. The wheel can either be jacked up before or after the device is clamped to the wheel so as to disengage the same from the surface upon which it is resting. The brake band is then tightened by use of the well known emergency brake lever and the resistance of the brake band can then be tested by exerting a downward pressure on the lever 11, urging the wheel against the action of the brake, the downward movement of the lever simultaneously moving the piston 10 downwardly in the cylinder so that the pressure beneath the piston will be indicated on the gauge 15.

It will be apparent that the device can be quickly and readily placed in position and the cylinder 9 and lever 11 transposed for use on either side of the frame according to the position of the wheel to which the device is to be applied.

I claim:

1. A brake testing device comprising a triangular body frame, means connected to each side of said frame for clamping said frame to a vehicle wheel, a supporting member transversely of one corner of the frame, a pressure cylinder carried by the supporting member, a piston movable in the cylinder, a pressure gauge having connection with the cylinder, and a lever having one end pivotally connected with the frame adjacent a second corner and operatively connected with the piston, whereby the pressure applied to the lever for rotating the wheel against the action of its brake will be registered by the gauge.

2. A brake testing device comprising a triangular body frame, means connected to each side of said frame for clamping said frame to a vehicle wheel, a supporting member transversely of one corner of the frame and connected thereto, a pressure measuring mechanism carried by the supporting member, and a lever having one end pivotally connected with the frame adjacent a second corner and operatively connected with the pressure measuring mechanism, whereby the pressure applied to the lever for rotating the wheel against the action of its brake will be registered by the pressure measuring means.

3. A brake testing device comprising a substantially triangular body frame, clamping hooks adjustably engaged with the frame intermediate the points thereof for clamping the frame to the vehicle wheel, bearing plates at each corner of the body frame adapted to be disposed between the wheel and the frame, an elongated supporting member transversely of one corner of the frame and secured thereto, pressure measuring means adapted to be removably connected to either end of the supporting member, and a lever having one end adapted to be pivotally connected to the body frame adjacent either of the corners opposite the supporting member and having operative connection with the pressure measuring means whereby the pressure applied to the lever for rotating the wheel against the action of its brake will be registered by the gauge.

4. A device of the class described including a triangular body frame, means connected to each side of the frame for clamping the frame to a vehicle wheel, an elongated supporting member carried by the frame and extending transversely of one corner thereof, pressure measuring means adapted to be removably connected to either end of the supporting member, and a lever having one end adapted to be pivotally connected to either side of the body frame adjacent a second corner and having operative connection with the pressure measuring means, whereby the pressure applied to the lever for rotating the wheel against the action of its brake will be registered by the pressure measuring means.

In testimony that I claim the foregoing I have hereunto set my hand at Watertown, in the county of Jefferson and State of Wisconsin.

CARL E. WEST.